US012422305B2

(12) United States Patent
Song

(10) Patent No.: US 12,422,305 B2
(45) Date of Patent: Sep. 23, 2025

(54) WIRELESS MEAT TEMPERATURE PROBE

(71) Applicant: ShenZhen AFU Intelligent Internet Technology Co., Ltd., Shenzhen (CN)

(72) Inventor: Zongliang Song, Shenzhen (CN)

(73) Assignee: ShenZhen AFU Intelligent Internet Technology Co., Ltd., Shenzhen (CN)

( * ) Notice: Subject to any disclaimer, the term of this patent is extended or adjusted under 35 U.S.C. 154(b) by 12 days.

(21) Appl. No.: 18/122,145

(22) Filed: Mar. 16, 2023

(65) Prior Publication Data

US 2024/0183720 A1  Jun. 6, 2024

(30) Foreign Application Priority Data

Nov. 30, 2022 (CN) .......................... 202211556713.7

(51) Int. Cl.
*G01K 1/024* (2021.01)

(52) U.S. Cl.
CPC ......... *G01K 1/024* (2013.01); *G01K 2207/02* (2013.01); *G01K 2215/00* (2013.01); *H04Q 2209/00* (2013.01); *H04Q 2209/40* (2013.01)

(58) Field of Classification Search
CPC ........... G01K 2207/02; G01K 2207/06; G01K 2215/00; G01K 1/00; G01K 1/024; G01K 1/026; G01K 1/045; G01K 1/08; G01K 1/12; H04Q 2209/00; H04Q 2209/10; H04Q 2209/40; H04Q 2209/43; H04Q 2209/70; H04Q 2209/80; H04Q 2209/82; H04Q 2209/823; H04Q 2209/826; H04Q 2209/88; H04Q 9/00
See application file for complete search history.

(56) References Cited

U.S. PATENT DOCUMENTS 9,462,416 B2 * 10/2016 Akitomi ................ H04W 4/023
11,506,545 B2 * 11/2022 Nivala ................... G01K 1/024
(Continued)

FOREIGN PATENT DOCUMENTS

| CN | 109060179 A | 12/2018 | |
| CN | 110308309 A | * 10/2019 | ............ G01P 15/125 |
| CN | 114323342 A | 4/2022 | |

(Continued)

OTHER PUBLICATIONS

First Office Action issued in counterpart Chinese Patent Application No. 202211556713.7, dated May 23, 2024.

*Primary Examiner* — Franklin D Balseca
(74) *Attorney, Agent, or Firm* — Westbridge IP LLC

(57) ABSTRACT

A wireless meat temperature probe comprising a probe body, wherein a first temperature sensor, a second temperature sensor, a wireless communication module, a control module, and a battery module for power supply are embedded in the probe body; the first temperature sensor and the second temperature sensor are respectively embedded in a first end and a second end of the probe body for monitoring an internal temperature of food and a furnace temperature respectively; the control module is connected to the first temperature sensor and the second temperature sensor for transmitting out the monitored temperature through the wireless communication module; and a wireless charging module is further embedded in the probe body and connected to the battery module for charging the battery module through a wireless charging device.

14 Claims, 7 Drawing Sheets

(56) References Cited

U.S. PATENT DOCUMENTS

| | | | | |
|---|---|---|---|---|
| 11,557,923 B2 * | 1/2023 | Lee | ...................... | H01F 27/025 |
| 2022/0409134 A1 * | 12/2022 | Oztaskent | ............ | H04R 1/1016 |

FOREIGN PATENT DOCUMENTS

| | | | | |
|---|---|---|---|---|
| CN | 216846608 U | * | 6/2022 | ......... G01K 2207/06 |
| CN | 217304207 U | | 8/2022 | |
| WO | 2022101846 A1 | | 5/2022 | |

* cited by examiner

WIRELESS MEAT TEMPERATURE PROBE

CROSS-REFERENCE TO RELATED APPLICATIONS

This application is based upon and claims priority to Chinese Patent Application No. 202211556713.7, filed on Nov. 30, 2022, the entire content of which is incorporated herein by reference.

TECHNICAL FIELD

The present invention relates to the technical field of temperature monitoring, and particularly relates to a wireless meat temperature probe.

BACKGROUND

A meat thermometer is widely used in the cooking process of barbecue and braising and roasting food materials. It is capable of detecting the temperature inside meat in real time, and performs reminders of controlling the cooking degree of the meat in case of reaching the preset internal temperature, and can also be used for calculating and reminding the remaining time of completion of cooking the meat.

The current wireless meat thermometer mainly has two types:

A sensor probe is in wired connection to a processing unit; components such as a battery, an MCU and a wireless transceiver are embedded in the processing unit; the target temperature is calculated after an analog signal of the sensor is read; and then, the calculation result is transmitted to an APP of a smart phone or other wireless receiving reminding devices in a Bluetooth or wireless mode.

The sensor probe is generally made of metal materials and is of a hollow structure; the battery, the MCU, the wireless transceiver and the sensor are embedded in the sensor; and after the temperature is calculated, the data is directly transmitted to the APP or other wireless receiving reminding devices in the Bluetooth or wireless mode.

The main defects of the current product include:

The cooking time and the flavor and taste of the meat are influenced by internal temperature and external heating temperature in meat roasting; and a recipe usually illustrates specific heating temperature requirement. One set of probes of a wired meat thermometer is usually capable of only measuring one temperature point so that it is needed to provide an additional temperature monitoring device for monitoring the furnace temperature, and the operation is troublesome.

Besides, an internal battery of an existing wireless meat thermometer needs to be charged, that is, the internal battery is fed through a positive electrode at a top end and a negative electrode at a metal tube wall; and when in use, it is often needed to insert the probe into the meat, and the meat is put into a furnace for roasting at high temperature, and therefore, it cannot perform normal charging because of poor electrode contact caused by oil stains, oxidation and water scales.

SUMMARY

A main objective of the present invention is to provide a wireless meat temperature probe to solve the problems that a probe in the prior art is capable of only measuring one temperature point and needs an additional temperature monitoring device for monitoring the furnace temperature, the operation is troublesome, and it cannot perform normal charging because of poor electrode contact which easily occurs during charging.

In order to achieve above objective, the present invention provides the wireless meat temperature probe. The wireless meat temperature probe comprises a probe body, wherein a first temperature sensor, a second temperature sensor, a wireless communication module, a control module and a battery module for power supply are embedded in the probe body;

the first temperature sensor and the second temperature sensor are respectively embedded in a first end and a second end of the probe body for monitoring the internal temperature of food and the furnace temperature respectively;

the control module is connected to the first temperature sensor and the second temperature sensor for transmitting out the monitored temperature through the wireless communication module; and a wireless charging module is also embedded in the probe body and connected to the battery module for charging the battery module through a wireless charging device.

Further, the wireless communication module is embedded in one end, far away from the first temperature sensor, of the probe body.

Further, the wireless meat temperature probe comprises a top shell, wherein the top shell is fixed at an end part of the probe body, and the wireless communication module and the wireless charging module are both embedded in the top shell.

Further, the top shell is hollow, one end of the top shell is open and is in threaded connection to the probe body, and the other end of the top shell is of a closed structure.

Further, the probe body is made of stainless steel and is hollow; and the first temperature sensor and a second temperature sensor are both embedded in the probe body.

Further, the top shell is made of a ceramic material.

Further, the wireless charging module comprises a ferrite framework embedded in the top shell and a charging coil wound on the ferrite framework; and the charging coil is made of a high-temperature-resistant material.

Further, the wireless meat temperature probe comprises a charging base, wherein a wireless charging assembly corresponding to the wireless charging module is embedded in the charging base; a slot is formed in the charging base for placing the probe body; and the wireless charging assembly corresponds to the slot for placing the probe body.

Further, the wireless meat temperature probe further comprises a display, wherein a wireless receiving module, a display module, a Bluetooth connection module and a WIFI connection module are embedded in the display;

the wireless receiving module is connected to the wireless communication module and the display module and is used for receiving the temperature information transmitted by the wireless communication module; the temperature information is displayed by the display module;

the Bluetooth connection module and the WIFI connection module are connected to a terminal for transmitting the received temperature information to the terminal; and multiple connection interfaces are available on the wireless receiving module, which allows the wireless receiving module to communicate simultaneously with the wireless communication modules on multiple needle bodies.

Further, a buzzer and a key are embedded in the display; the buffer performs reminders based on set conditions; and temperature conditions are set using the key for monitoring the probe body.

Further, a slot is formed in the charging base for placing the display; and the charging base is capable of wirelessly charging the display.

Further, a charging interface is formed in the charging base and is externally connected to an adapter for power supply.

Further, magnets are embedded in the display and the charging base.

According to another aspect of the present invention, a method for cooking a meat cooking temperature is provided and comprises the following steps:

acquiring the internal temperature of food through the first temperature sensor, and determining a resting temperature rise value based on the internal temperature of the food, wherein a calculation formula of the resting temperature rise value is $$\Delta T_R = K_1(T_0 - T_0 \ldots T_0), \text{ wherein } K_1 = \frac{\overline{X}_T}{\overline{T}},$$

$\overline{X}_T$ representing an average temperature rise value, $\overline{T}$ representing an average time interval of collecting the internal temperature of food during cooking, $T_0$ representing a second time interval, $T_1$ representing a first time interval, and $T_n$ representing a (n+1)th time interval; the values from $T_0$ to $T_n$ gradually decreasing, $\overline{T}=(T_0+T_1 \ldots T_n)/(n+1)$, $\overline{X}_T=(X_{T0}+X_{T1} \ldots X_{Tn})/(n+1)$ $X_{T0}$, representing the temperature value obtained at T0, $X_{T1}$ representing the temperature value obtained at T1, and $X_{Tn}$ representing the temperature value obtained at Tn;

acquiring an in-furnace temperature value through the second temperature sensor, and determining the change $\Delta T_{Rs}$ of the resting temperature based on the in-furnace environment temperature value and the resting temperature rise value, wherein the calculation formula of $\Delta T_{RS}$ is:

$$\Delta T_{Rs} = \Delta T_R\left(\frac{P_{TA}}{T_{AS}}\right); P_{TA} = \frac{P}{K_1},$$

P representing the in-furnace environment temperature value, and $T_{AS}$ representing an initial in-furnace environment temperature value;

acquiring an internal surplus temperature rise value of the food, wherein the calculation formula is $\Delta T_{RT}=T_G-(T_C+\Delta T_{RS})$, $\Delta T_{RT}$ representing a surplus temperature rise value; $T_G$ representing a target temperature value; $T_C$ representing a current in-furnace environment temperature value; and determining rest time, wherein the calculation formula is:

$$T_{RM} = \frac{K_C}{\Delta T_{RT}}, K_C = K_1\frac{\overline{X}_T}{\overline{T}}, T_{RM}$$

representing the remaining time, and $K_C$ representing the current average internal value.

In an embodiment of the present invention, the probe body is provided, and the first temperature sensor, the second temperature sensor, the wireless communication module, the control module and the battery module for power supply are embedded in the probe body; the first temperature sensor and the second temperature sensor are respectively embedded in the first end and the second end of the probe body for monitoring the internal temperature of food and the furnace temperature respectively; the control module is connected to the first temperature sensor and the second temperature sensor for transmitting out the monitored temperature through the wireless communication module; and the wireless charging module is embedded in the probe body and connected to the battery module for charging the battery module through the wireless charging device. The purposes of respectively monitoring the internal temperature of food and the furnace temperature through the first temperature sensor and the second temperature sensor on the same probe body, wirelessly transmitting temperature information through the wireless communication module, charging the battery module in the probe body through the wireless charging module, and avoiding difficult charging caused by electrode pollution are achieved; and therefore, the internal temperature of food and the furnace temperature can be conveniently simultaneously monitored, and the technical effect of improving the charging reliability is achieved. Further, it can solve the problems that the probe in the related art is capable of only measuring one temperature point and needs the additional temperature monitoring device for monitoring the furnace temperature, the operation is troublesome, and it cannot perform normal charging because of poor electrode contact which easily occurs during charging.

BRIEF DESCRIPTION OF THE DRAWINGS

The present invention can be further understood through the accompanying drawings, which constitute a part of the present invention, thereby making other features, objects and advantages of the present invention more apparent. The accompanying drawings and descriptions of the schematic embodiments of the present invention are used to explain the present invention, and do not cause an improper limitation to the present invention. In the FIGs.

Figure 1:
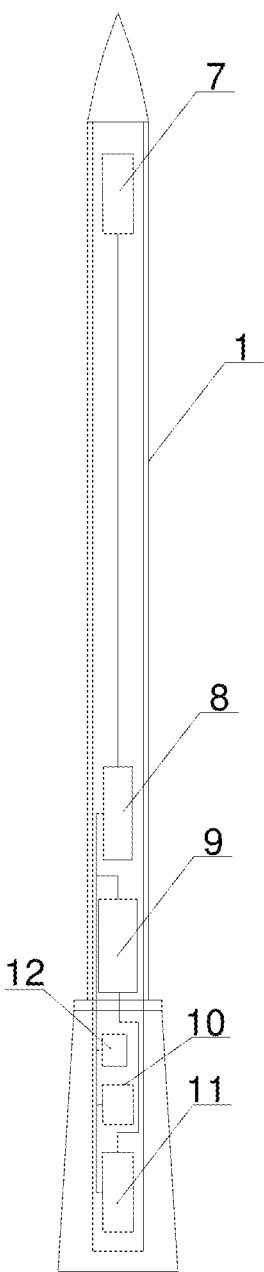
FIG. 1 is a structure schematic diagram according to an embodiment of the present invention.

In the figures: 1, probe body; 2, charging base; 3, display; 4, top shell; 5, slot for placing display; 6, slot for placing probe body; 7, first temperature sensor; 8, control module; 9, battery module; 10, second temperature sensor; 11, wireless charging module, and 12, wireless communication module, 1101, ferrite framework, 1102, charging coil.

DETAILED DESCRIPTION OF THE EMBODIMENTS

In order to make those skilled in the art better understand the solutions of the present invention, the technical solutions in the embodiments of the present invention will be clearly and completely described below with reference to the accompanying drawings in the embodiments of the present invention. Obviously, the described embodiments are only some of the embodiments of the present invention, but not all of the embodiments. Based on the embodiments in the present invention, all other embodiments obtained by those of ordinary skill in the art without creative work shall fall within the protection scope of the present invention.

It should be noted that the terms "first", "second", etc. in the specification and claims of the present invention and the above drawings are used to distinguish similar objects, and are not necessarily used to describe a specific sequence or sequence. It is to be understood that the data so used are interchangeable under appropriate circumstances for the embodiments of the application described herein.

In the present invention, the terms "upper", "lower", "inside" and the like indicate the orientation or position relationship based on the orientation or position relationship shown in the accompanying drawings. These terms are mainly used for better describing the present invention and its embodiments, not to define that the indicated device, element or component must have a specific orientation, or be constructed and operated in a specific orientation.

In addition, some of the above terms may be used for expressing other meanings besides orientation or position relationship, for example, the term "upper" may also be used for expressing some dependency or connection relationship in some cases. For ordinary technicians in the art, the specific meanings of these terms in the application can be understood according to specific situations In addition, the terms "embedded", "provided", "connection", "fixed", etc. should be understood broadly. For example, "connection" can be fixed connection, removable connection, or integral structure; it may be mechanical connection or electrical connection; it may be direct connection, or indirect connection through intermediate media; or it may be internal communication between two devices, elements or components. For ordinary technicians in the art, the specific meaning of the above terms in the present invention can be understood according to the specific situation.

In addition, the term "multiple" shall mean two or more.

It should be noted that the embodiments in the present invention and the features of the embodiments may be combined with each other in the case of no conflict. The present invention will be described in detail below with reference to the accompanying drawings and in conjunction with the embodiments.

The main defects of the current meat temperature probe products include:

The cooking time and the flavor and taste of the meat are influenced by internal temperature and external heating temperature in meat roasting; and a recipe usually illustrates specific heating temperature requirement. One set of probes of a wired meat thermometer is usually capable of only measuring one temperature point and needs an additional temperature monitoring device for monitoring the furnace temperature, and the operation is troublesome.

Besides, an internal battery of an existing wireless meat thermometer needs to be charged, that is, the internal battery is fed through a positive electrode at a top end and a negative electrode at a metal tube wall; when in use, it is often needed to insert the probe into the meat, and the meat is put into a furnace for roasting at high temperature, and therefore, it cannot perform normal charging because of poor electrode contact caused by oil stains, oxidation and water scales.

Figure 2:
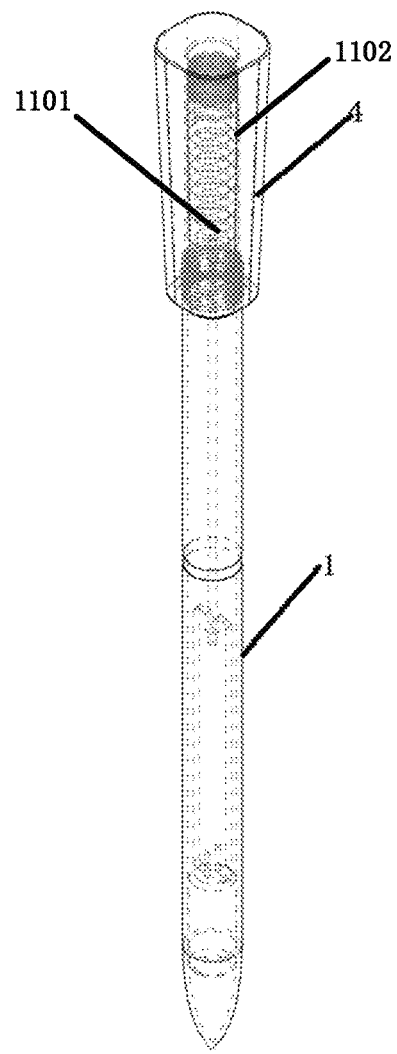
FIG. 2 is a structure schematic diagram of a probe according to an embodiment of the present invention.

Therefore, in order to solve above defects, an embodiment of the present invention provides a wireless meat temperature probe as shown in FIG. 1 to FIG. 2. The wireless meat temperature probe comprises a probe body 1, wherein a first temperature sensor 7, a second temperature sensor 10, a wireless communication module 12, a control module 8 and a battery module 9 for power supply are embedded in the probe body 1;

the first temperature sensor 7 and the second temperature sensor 10 are respectively embedded in a first end and a second end of the probe body 1 for monitoring the internal temperature of food and the furnace temperature respectively; and the control module 8 is connected to the first temperature sensor 7 and the second temperature sensor 10 for transmitting out monitored temperature through the wireless communication module 12.

A wireless charging module 11 is also embedded in the probe body 1 and connected to the battery module 9 for charging the battery module 9 through a wireless charging device.

In the embodiment, the wireless meat temperature probe is mainly composed of the probe body 1, the first temperature sensor 7, the second temperature sensor 10, the wireless communication module 12, the control module 8 and the battery module 9 for power supply. The probe body 1 serves as a main body structure of the probe, and the probe body 1 is hollow and used for mounting electronic elements such as the first temperature sensor 7, the second temperature sensor 10, the wireless communication module 12, the control module 8 and the battery module 9 for power supply. When in use, a tip end of the probe body 1 is punctured into the to-be-roasted food, and the other end of the probe body 1 is outside the food. Because it is needed to acquire the internal temperature and the external temperature of meat at the same time during meat roasting, a structure that one end of the probe body 1 is punctured into the meat and the other end of the probe body is outside the meat is fully utilized; and the first temperature sensor 7 and the second temperature sensor 10 are embedded in the two ends of the probe body 1 respectively. When in use, the first temperature sensor 7 is punctured into the meat along with the tip end of the probe body 1, and the second temperature sensor 10 is outside the meat, so that the first temperature sensor 7 and the second temperature sensor 10 are capable of respectively monitoring the temperature inside the meat (internal temperature of the food) and the temperature outside the meat (the furnace temperature); and then the temperature measurement range of one probe can be improved, so that a user can accurately control the internal temperature and the external temperature, and the use convenience is improved.

In order to facilitate information communication between the probe and external equipment, a wireless communication mode is adopted in the embodiment. That is, the wireless communication module 12 and the control module 8 are mounted in the probe body 1; an information input end of the control module 8 is connected to the first temperature sensor 7 and the second temperature sensor 10 while an information output end of the control module is connected to the wireless communication module 12. The control module 8 is capable of receiving electric signals transmitted by the first temperature sensor 7 and the second temperature sensor 10, converting the electric signals into temperature information, and transmitting the temperature information to external equipment, such as a mobile phone, a server and an intelligent display 3, in a wireless communication mode through the wireless communication module 12. The wireless communication module 12 can specifically be a Bluetooth communication module or a WIFI communication module and the like, and it is not limited herein.

In order to solve the problems that a probe in related art is charged in an electrode plug-in mode and might be difficulty charged because of poor electrode contact caused by oil stains on an electrode of the probe, in the embodiment, the wireless charging module 11 is additionally embedded in the probe body 1, wherein the wireless charging module 11 is connected to the battery module 9; and when the probe body 1 is placed on a corresponding wireless charging device, the battery module 9 can be charged in a wireless charging mode.

The battery module 9 serving as a power supply unit of the probe is electrically connected to all electronic devices in the probe for supplying running current to all the electronic devices. Specifically, a current output end of the battery module 9 is respectively connected to the first temperature sensor 7, the second temperature sensor 10, the wireless communication module 12 and the control module 8 so as to achieve the power supply function.

In order to avoid affecting information communication after the probe body 1 is punctured into meat, the wireless communication module 12 is embedded in one end, away from the first temperature sensor 7, of the probe body 1, that is, the wireless communication module 12 and the wireless charging module 11 are embedded in the same end of the probe body 1 in the embodiment.

The probe body 1 is hollow, which facilitates the embedding of the internal devices. One end of the probe body 1 is a closed end, and the other end of the probe body is an open end. The electronic devices are embedded in the probe body 1 through the open end. In order to facilitate the embedding and closing of all electronic devices in the probe body 1, the wireless meat temperature probe in the embodiment also comprises a top shell 4, wherein the top shell 4 is fixed at an end part of the probe body 1, and the wireless communication module 12 and the wireless charging module 11 are embedded in the top shell 4. In the embodiment, the top shell 4 is used for embedding the wireless communication module 12 and the wireless charging module 11 and closing the open end of the probe body 1.

The top shell is hollow, which facilitates the embedding of the wireless communication module 12 and the wireless charging module 11 in the top shell 4. In order to facilitate the connection of the top shell 4 to the probe body 1, one end of the top shell 4 is opened and is in threaded connection with the probe body 1, and the other end of the top shell is of a closed structure.

In order to further enhance the connection between the probe body 1 and the top shell 4, the probe body 1 is made of stainless steel; the probe body 1 is hollow; the first temperature sensor 7 and the second temperature sensor 10 are both embedded in the probe body 1; an external thread is available in an end part of the probe body 1, which allows the thread connection of the top shell 4 to the end part of the probe body 1. The wall thickness of the probe body 1 is 0.2 mm; the top shell 4 is made of a ceramic material; and specifically, the top shell 4 can be made of zirconia ceramic, so it can tolerate the high temperature of furnace fire and can also allow a wireless signal to pass through.

An antenna of the wireless communication module 12 is made of a spring-type copper alloy material. The wireless charging module 11 comprises a ferrite framework 1101 arranged in the top shell 4 and a charging coil 1102 wound on the ferrite framework 1101; the charging coil 1102 is made of a high-temperature-resistant material; the frequency of wireless charging is 125 Khz; and an external temperature sensor is embedded in a hollow interior of the wireless antenna, and a conductor of the wireless charging antenna also penetrates through the hollow interior.

Figure 3:
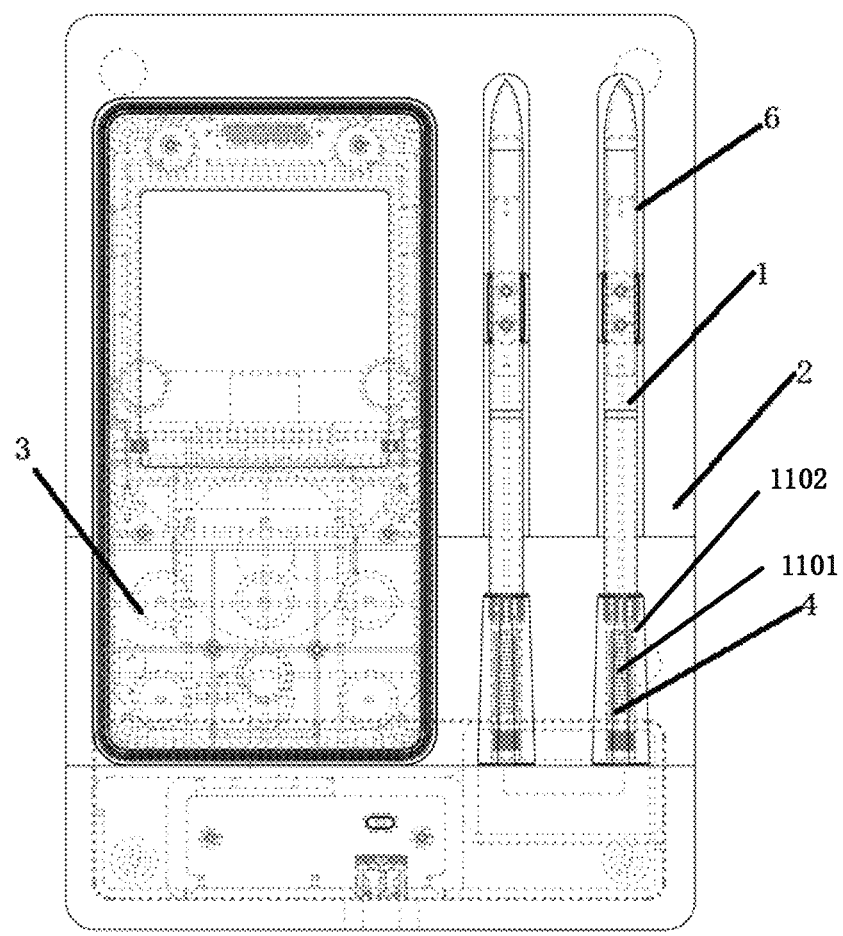
FIG. 3 is an assembly structure schematic diagram of a charging base and a probe according to an embodiment of the present invention.
Figure 4:
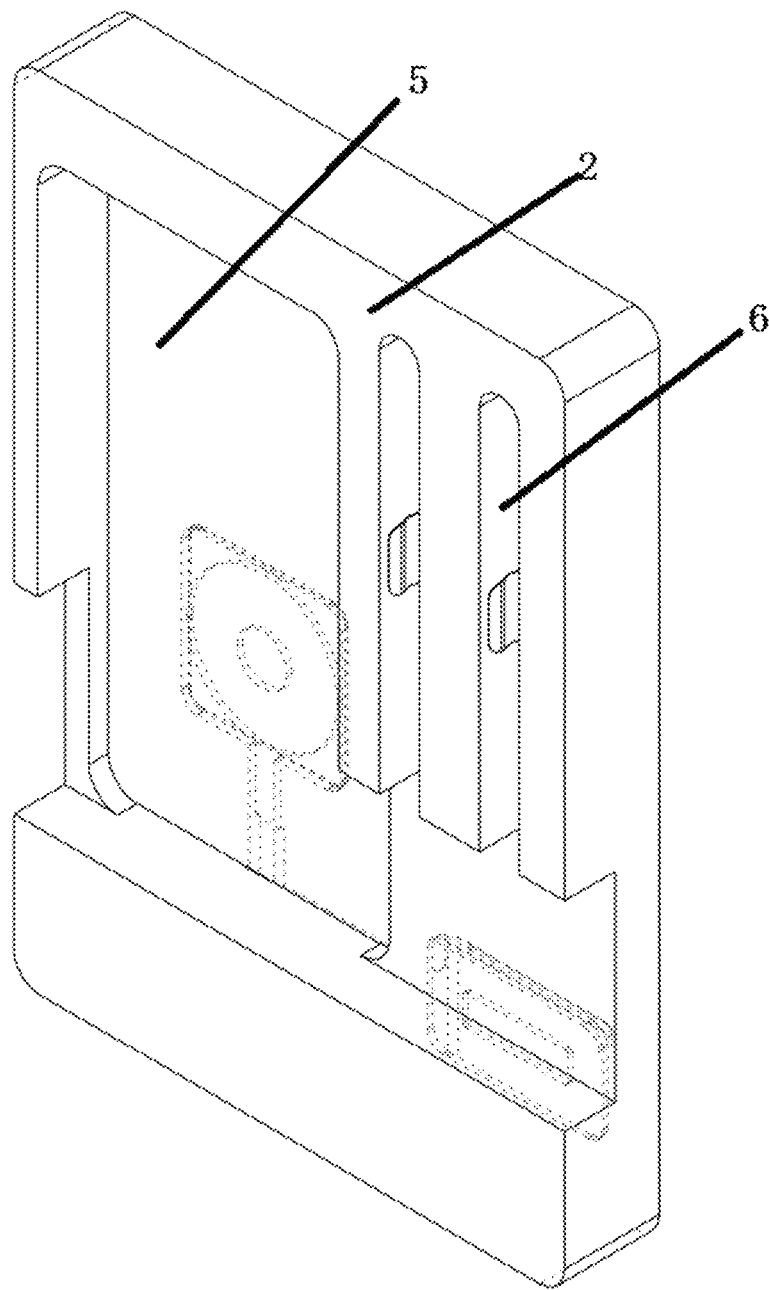
FIG. 4 is a structure schematic diagram of axial measurement of a charging base according to an embodiment of the present invention.

As shown in FIG. 3 and FIG. 4, in order to facilitate placement and wireless charging of the probe, the wireless meat temperature probe in the embodiment further comprises a charging base 2, wherein a wireless charging assembly corresponding to the wireless charging module 11 is embedded in the charging base 2; a slot is formed in the charging base 2 for placing the probe body 1; and the wireless charging assembly corresponds to the slot for placing the probe body 1.

Specifically, it is to be noted that when the probe body 1 is placed in the slot for placing the probe body in the charging base 2, the wireless charging assembly located on the charging base 2 is capable of charging the battery module 9 through the wireless charging module 11 in the probe body 1. In the embodiment, the charging base 2 can be made of wood; multiple slots for placing the probe body may be provided; and a PCB control board is embedded in the charging base 2.

Figure 7:
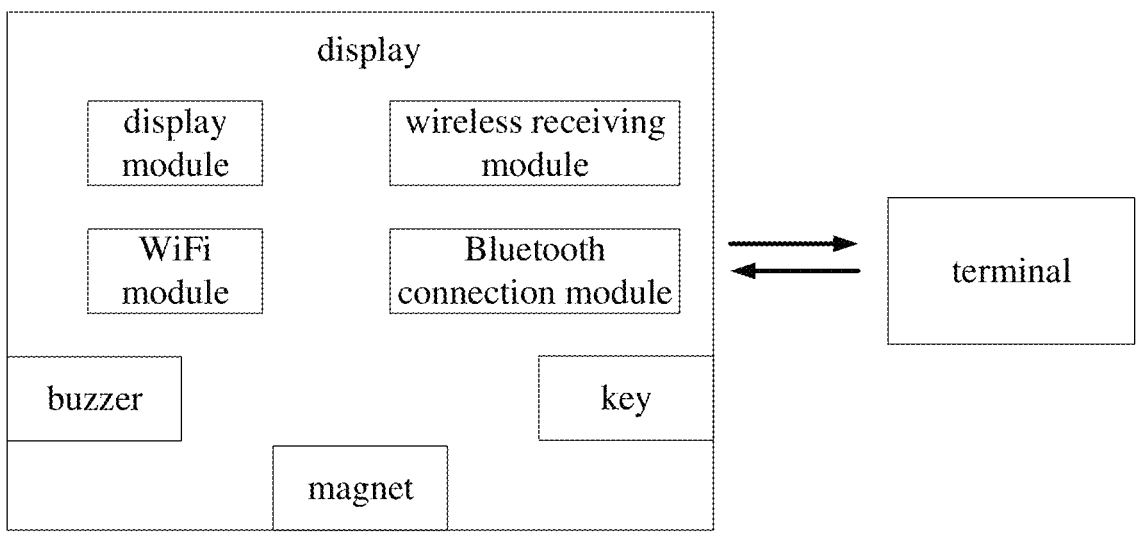
FIG. 7 is a schematic diagram of according to an embodiment of the present invention.

As shown in FIG. 7, in order to display the temperature information monitored by the probe conveniently, the wireless meat temperature probe in the embodiment further comprises a display 3; and a wireless receiving module, a display module, a Bluetooth connection module and a WIFI connection module are embedded in the display 3;

the wireless receiving module is connected to the wireless communication module and the display module for receiving the temperature information transmitted by the wireless communication module 12; the temperature information is displayed by the display module;

the Bluetooth connection module and the WIFI connection module are connected to a terminal for transmitting the received temperature information to the terminal; and multiple connection interfaces are available on the wireless receiving module, which allows the wireless receiving module to communicate simultaneously with the wireless communication modules on multiple needle bodies.

Specifically, it is to be noted that the display 3 serving as a displaying device has the functions of transceiving information and displaying information, and the whole display is composed of the wireless receiving module, the display module, the Bluetooth connection module and the WIFI connection module. The wireless receiving module corresponds to and communicates with the wireless communication module 12 in the probe body 1 and is capable of receiving the temperature information transmitted by the wireless communication module 12; and the display module is capable of displaying the received temperature information and simultaneously displaying temperature information monitored by the multiple probes. The display 3 is capable of transmitting the received information to terminal devices such as a mobile phone and a server through the Bluetooth connection module and the WIFI connection module and simultaneously transmitting received instructions of the terminal devices to the probe body 1 or a control system in the display 3. The display module can be an LCD screen; the Bluetooth connection module is a Bluetooth BLE chip; and the wireless receiving module is a WIFI chip, a wireless transceiving chip and an antenna.

In order to remind a user of the food cooking time, a buzzer and a key are embedded in the display 3; the buzzer performs reminders based on set conditions; temperature conditions are set using the key for monitoring the probe body 1; and these operations can be synchronously completed on the terminals such as the mobile phone.

During work, one display can be connected to at most eight probes at the same time in a wireless mode, and the received temperature is transmitted to an APP or a cloud by means of Bluetooth and WIFI. The LCD screen is capable of displaying the internal and external temperatures of the corresponding probes. The built-in buzzer can remind the user of completion of food cooking. The target temperature of the corresponding probe can be set using the key, and setting can be completed through the mobile phone APP.

In order to charge the display 3 conveniently, a slot is formed in the charging base 2 for placing the display 3; and the charging base 2 is capable of wirelessly charging the display 3. Specifically, a wireless charging coil 1102 is also embedded in the display 3; and a wireless charging coil 1102 is embedded in a position, corresponding to slot for placing the display 3, in the charging base 2. The probe body 1 and the display 3 can be wirelessly charged through the charging base 2 simultaneously, thereby improving the convenience of use.

In order to connect the charging base 2 with a power supply conveniently, a charging interface is available on the charging base 2 and can be externally connected to an adapter for power supply; and the charging interface can be a USB interface or a Type-C interface. In order to fix the display 3 and the charging base 2 conveniently in use, magnets are embedded in the display 3 and the charging base 2.

Figure 5:
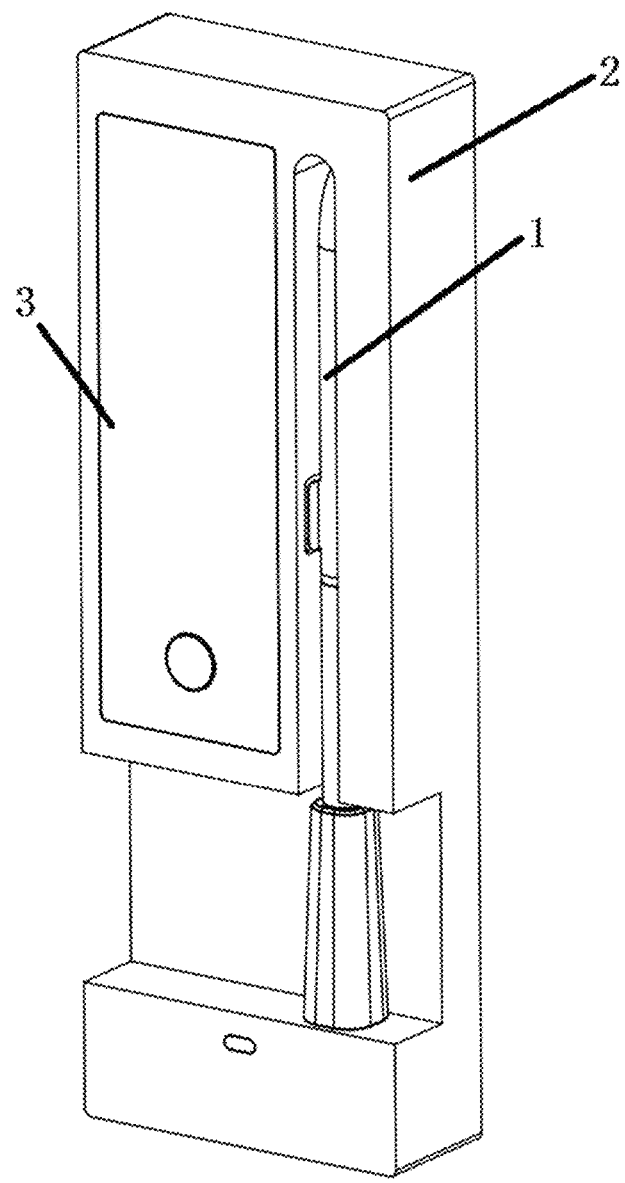
FIG. 5 is a schematic diagram of a single probe according to an embodiment of the present invention.
Figure 6:
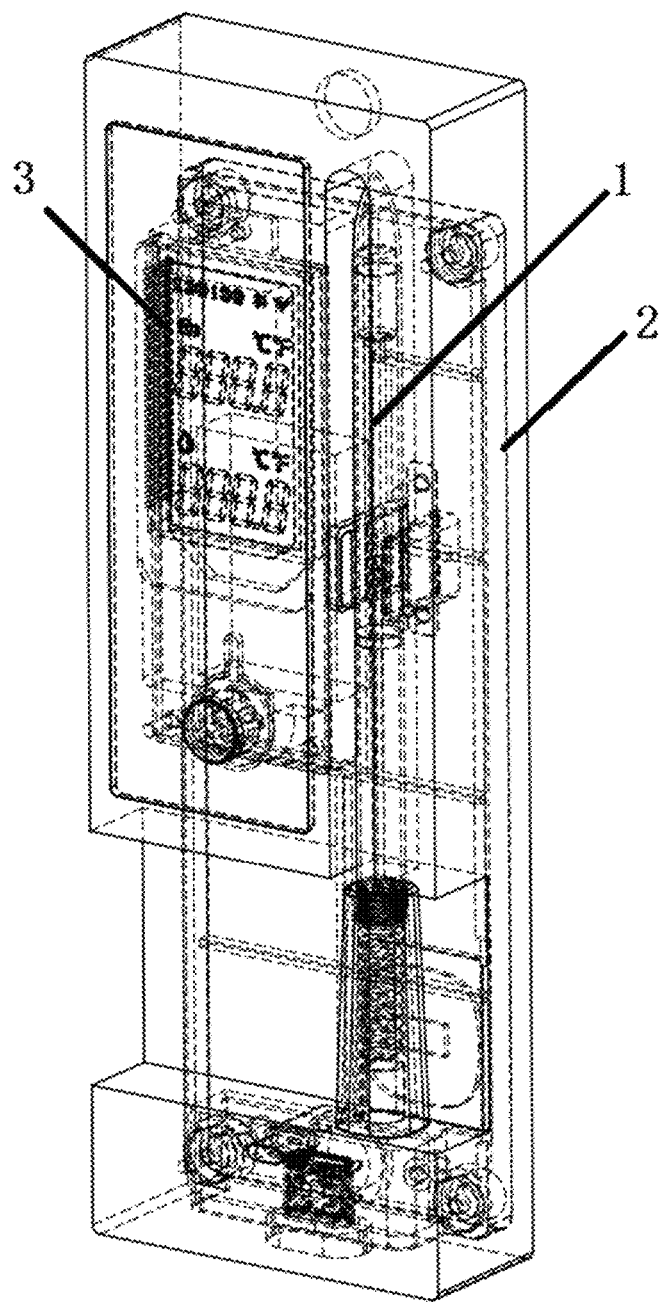
FIG. 6 is another schematic diagram of a single probe according to an embodiment of the present invention.

One display 3 and two temperature probes can be arranged on each charging base 2 as shown in FIG. 1; and one display 3 and one temperature probe can also be arranged on each charging base 2 as shown in FIG. 5 and FIG. 6.

According to another aspect of the present invention, a method for controlling meat cooking temperature is provided. In order to achieve an expected result, it is needed to collect data at different time intervals; the process is not linear, so results in different periods may be different. Firstly, the completion time can be determined through the first detection, it is should be considered the temperature rise of food under resting temperature rise after the it is away from the fire. The internal temperature values can be obtained at different time periods based on the temperature rise values at the cooking starting stage, the second stage, etc., Then, the resting temperature rise can be determined based on the internal temperature values.

Specifically, the method for controlling comprises the following steps:
acquiring the internal temperature of food through the first temperature sensor, and determining a resting temperature rise value based on the internal temperature of the food, wherein
a calculation formula of the resting temperature rise value is $$\Delta T_R = K_1(T_0 - T_0 \ldots T_0), \text{ wherein } K_1 = \frac{\bar{X}_T}{\bar{T}},$$

$\bar{X}_T$ representing an average temperature rise value, $\bar{T}$ representing an average time interval of collecting the internal temperature of food during cooking, $T_0$ representing a first time interval, $T_1$ representing a second time interval, and $T_n$ representing a (n+1)th time interval; the values from $T_0$ to $T_n$ gradually decreasing, $\bar{T}=(T_0+T_1 \ldots T_n)/(n+1)$, $\bar{X}_T=(X_{T0}+X_{T1} \ldots X_{Tn})/(n+1)$ $X_{T0}$ representing the temperature, value obtained at T0, $X_{T1}$ representing the temperature value obtained at T1, and $X_{Tn}$ representing the temperature value obtained at Tn;

for example, n=2, the first time interval is $T_0$=20 min, $X_{T0}$=20° C.; the second time interval is $T_1$=10 min, $X_{T1}$=40° C.; the last time interval is $T_2$=5 min, $X_{T2}$=60° C.; firstly, calculating the average $\bar{T}$=11.7 min, $\bar{X}_\tau$=40° C.; and finally calculating internal calorific value through the first formula, namely, $K_1$=3.4° C./min (Celsius per min);

obtaining $\Delta T_R$=3.4 (20 min–10 min–5 min)=5° C. based on $\Delta T_R=K_1(T_0-T_1-T_2)$; and acquiring an in-furnace temperature value through the second temperature sensor, and determining the change $\Delta T_{Rs}$ of the resting temperature based on the in-furnace environment temperature value and the resting temperature rise value, wherein the calculation formula of $\Delta T_{Rs}$ is:

$$\Delta T_{RS} = \Delta T_R\left(\frac{P_{TA}}{T_{AS}}\right); P_{TA} = \frac{P}{K_1},$$

P representing the in-furnace environment temperature value, and $T_{AS}$ representing an initial in-furnace environment temperature value;

P can be the mean of in-furnace environment temperature values obtained by the second temperature sensors on the multiple probes; $T_{AS}$ can also be the mean of initial in-furnace environment temperature values obtained by the second temperature sensors on the multiple probes;

by taking P=116° C., $T_{AS}$=210° C. as an example, $\Delta T_{Rs}$=2.8° C.;

acquiring the internal surplus temperature rise value of the food, wherein the calculation formula is $\Delta T_{RT}=T_G-(T_C+\Delta T_{RS})$, $\Delta T_{RT}$ representing the residual temperature rise value, $T_G$ representing a target temperature value, and $T_C$ representing a current in-furnace environment temperature value; and when multiple probes are adopted, $T_C$ represents the mean of the in-furnace environment temperature values detected by the second temperature sensors on the multiple probes;

and by taking $T_C$=116° C., $T_G$=160° C. as an example, $\Delta T_{RT}$=160° C.–(116° C.+2.8° C.)=41.2° C.

determining rest time, wherein the calculation formula is:

$$T_{RM} = \frac{K_C}{\Delta T_{RT}}, K_C = K_1\frac{\bar{X}_T}{\bar{T}},$$

$T_{RM}$ representing the remaining time, and Kc representing the current average internal value.

According to the embodiment, the remaining time of completion of cooking can be calculated according to the temperature rise speed of the internal temperature of food and the temperature difference between the internal temperature of the food and the in-furnace environment temperature, thereby improving the cooking effect.

The above descriptions are only preferred embodiments of the present invention, and are not intended to limit the present invention. For those skilled in the art, the present invention may have various modifications and changes. Any modification, equivalent replacement, improvement, etc. made within the spirit and principle of this application shall be included within the protection scope of this application.

The invention claimed is:

1. A system comprising:
a wireless meat temperature probe, comprising a probe body, wherein a first temperature sensor, a second temperature sensor, a wireless communication module, a control module, and a battery module for power supply are embedded in the probe body;
the first temperature sensor and the second temperature sensor are respectively embedded in a first end and a second end of the probe body for monitoring an internal temperature of food and a furnace temperature respectively;
the control module is connected to the first temperature sensor and the second temperature sensor for transmitting out the monitored internal food temperature and the monitored furnace temperature through the wireless communication module;
a wireless charging module is further embedded in the probe body and connected to the battery module for charging the battery module through a wireless charging device;
the system further comprises a charging base;
a wireless charging assembly corresponding to the wireless charging module is embedded in the charging base;
a slot is formed in the charging base for placing the probe body; and
the wireless charging assembly corresponds to the slot for placing the probe body,
wherein the first temperature sensor is configured to acquire the internal temperature of food, and a resting temperature rise value is determined based on the internal temperature of the food by a calculation formula: $\Delta T_R = K_1(T_0 - T_1 \ldots T_n)$, wherein $$K_1 = \frac{\overline{X}T}{\overline{T}},$$

$\overline{X}_T$ represents an average temperature rise value, $\overline{T}$ represents an average time interval of collecting the internal temperature of food during cooking,
$T_0$ represents a first time interval, $T_1$ represents a second time interval, and $T_n$ represents a $(n+1)^{th}$ time interval; values from $T_0$ to $T_n$ gradually decreases, $\overline{T}=(T_0+T_1 \ldots T_n)/(n+1)$, $\overline{X}_T=(X_{T0}+X_{T1} \ldots X_{Tn})/(n+1)$, $X_{T0}$ represents a temperature value obtained at $T_0$, $X_{T1}$ represents a temperature value obtained at $T_1$, and $X_{Tn}$ represents a temperature value obtained at $T_n$;
the second temperature sensor is configured to acquire an in-furnace environment temperature value, and a change $\Delta T_{Rs}$ of a resting temperature is determined based on the in-furnace environment temperature value and the resting temperature rise value, wherein a calculation formula of $\Delta T_{Rs}$ is:

$$\Delta T_{Rs} = \Delta T_R \left(\frac{P_{TA}}{T_{AS}}\right); P_{TA} = \frac{P}{K_1},$$

P represents the in-furnace environment temperature value, and $T_{AS}$ represents an initial in-furnace environment temperature value.

2. The system according to claim 1, wherein the wireless communication module is embedded in one end, far away from the first temperature sensor, of the probe body.

3. The system according to claim 2, further comprising a top shell, wherein the top shell is fixed at an end part of the probe body; and the wireless communication module and the wireless charging module are both embedded in the top shell.

4. The system according to claim 3, wherein the top shell is hollow, one end of the top shell is open and is threadedly connected to the probe body, and other end of the top shell is of a closed structure.

5. The system according to claim 4, wherein the probe body is made of stainless steel and is hollow.

6. The system according to claim 4, wherein the top shell is made of a ceramic material.

7. The system according to claim 6, further comprising a display; a wireless receiving module, a display module, a Bluetooth connection module, and a WIFI connection module embedded in the display;
the wireless receiving module is connected to the wireless communication module and the display module and is used for receiving temperature information transmitted by the wireless communication module; the temperature information is displayed by the display module;
the Bluetooth connection module and the WIFI connection module are connected to a terminal and are used for transmitting the received temperature information to the terminal.

8. The system according to claim 7, wherein a buzzer and a key are embedded in the display;
the buzzer performs reminders based on set conditions; and
temperature conditions are set using the key for monitoring the probe body.

9. The system according to claim 8, wherein a slot is formed in the charging base for placing the display; and the charging base is capable of wirelessly charging the display.

10. The system according to claim 7, wherein a slot is formed in the charging base for placing the display; and the charging base is capable of wirelessly charging the display.

11. The system according to claim 3, wherein the probe body is made of stainless steel and is hollow; and the first temperature sensor and the second temperature sensor are both embedded in the probe body.

12. The system according to claim 2, wherein the probe body is made of stainless steel and is hollow; and the first temperature sensor and the second temperature sensor are both embedded in the probe body.

13. The system according to claim 1, wherein the probe body is made of stainless steel and is hollow; and the first temperature sensor and the second temperature sensor are both embedded in the probe body.

14. A method for controlling meat cooking temperature, utilizing a wireless meat temperature probe according to claim 1 and comprising steps of:

acquiring the internal temperature of food through the first temperature sensor, and determining the resting temperature rise value based on the internal temperature of the food, wherein
the calculation formula of the resting temperature rise value is $\Delta T_R = K_1 (T_0 - T_1 \ldots T_n)$, wherein $$K_1 = \frac{\overline{X_T}}{\overline{T}},$$

$\overline{X_T}$ representing the average temperature rise value, $\overline{T}$ representing the average time interval of collecting the internal temperature of food during cooking,
  $T_0$ representing the first time interval, $T_1$ representing the second time interval, and $T_n$ representing the $(n+1)^{th}$ time interval; the values from $T_0$ to $T_n$ gradually decreasing, $\overline{T} = (T_0 + T_1 \ldots T_n)/(n+1)$, $\overline{X_T} = (X_{T0} + X_{T1} \ldots X_{Tn})/(n+1)$, $X_{T0}$ representing the temperature value obtained at $T_0$, $X_{T1}$ representing the temperature value obtained at $T_1$, and $X_{Tn}$ representing the temperature value obtained at $T_n$;
  acquiring the in-furnace environment temperature value through the second temperature sensor, and determining the change $\Delta T_{Rs}$ of the resting temperature based on the in-furnace environment temperature value and the resting temperature rise value, wherein
the calculation formula of $\Delta T_{Rs}$ is:

$$\Delta T_{Rs} = \Delta T_R \left( \frac{P_{TA}}{T_{AS}} \right); P_{TA} = \frac{P}{K_1},$$

P representing the in-furnace environment temperature value, and $T_{AS}$ representing the initial in-furnace environment temperature value;
  acquiring an internal surplus temperature rise value of the food, wherein a calculation formula for the internal surplus temperature rise value of the food is $\Delta T_{RT} = T_G - (T_C + \Delta T_{RS})$, $\Delta T_{RT}$ representing a surplus temperature rise value; $T_G$ representing a target temperature value; $T_C$ representing a current in-furnace environment temperature value; and
  determining rest time, wherein a calculation formula for the rest time is:

$$T_{RM} = \frac{K_C}{\Delta T_{RT}}, K_C = K_1 \frac{\overline{X_T}}{\overline{T}},$$

$T_{RM}$ representing a remaining time, and Kc representing a current average internal value.

* * * * *